United States Patent [19]

Gille et al.

[11] Patent Number: 6,126,877
[45] Date of Patent: Oct. 3, 2000

[54] METHOD OF MAKING A PART HAVING FILMS COATED WITH PLASTIC

[75] Inventors: Denis Gille, Bellignat; Thierry Barrault, Geovreisset, both of France

[73] Assignee: Compagnie & Plastic Omnium, Lyons, France

[21] Appl. No.: 09/302,784

[22] Filed: Apr. 30, 1999

[30] Foreign Application Priority Data

Apr. 30, 1999 [FR] France ................................ 98 05498

[51] Int. Cl.[7] .................................................. B29C 37/00
[52] U.S. Cl. ..................... 264/138; 264/152; 264/247; 264/254; 264/255; 264/260; 264/328.8; 264/328.12
[58] Field of Search ..................... 264/138, 152, 264/247, 254, 255, 328.1, 328.8, 260, 261, 328.12

[56] References Cited

U.S. PATENT DOCUMENTS

| 5,304,273 | 4/1994 | Kenrick et al. | 156/219 |
| 5,725,712 | 3/1998 | Spain et al. | 156/230 |
| 5,814,260 | 9/1998 | Arai | 264/245 |
| 5,960,527 | 10/1999 | Ellison et al. | 29/428 |

FOREIGN PATENT DOCUMENTS

| 0502672 | of 0000 | European Pat. Off. |
| 0692362 | of 0000 | European Pat. Off. |
| 1813915 | of 0000 | Germany |
| 869416 | of 0000 | United Kingdom |

OTHER PUBLICATIONS

Patent Abstracts of Japan, vol. 14, No. 311 (M–0994), Jul. 4, 1990 (JP 02 102010).
Patent Abstracts of Japan, vol. 98, No. 2, Jan. 30, 1998 (JP 09 267353).

*Primary Examiner*—Jill L. Heitbrink
*Assistant Examiner*—Dae Young Lee
*Attorney, Agent, or Firm*—Schweitzer Cornman Gross & Bondell LLP

[57] ABSTRACT

The cavity of a mold for making a plastics material part is lined using at least two, preferably decorative, pieces of film. The pieces of film are shaped and cut out so as to be accurately juxtaposed in the film cavity. Molten plastics material is introduced into the mold cavity in register with each piece of film in controlled manner so that the front of plastics material flowing within the mold cavity for the purpose of filling it advances within the mold so as to stretch each piece of film in centrifugal manner so that the film is neither displaced nor folded. The fronts of plastics material advancing over each piece of film meet either in locations of the mold where there is no film or else in register with the facing edges of two pieces of films, where appropriate, so that the entire surface of each piece of film is covered in a layer of plastics material. If necessary an additional quantity of molten plastics material is then introduced into the mold cavity so as to fill it completely.

3 Claims, 1 Drawing Sheet

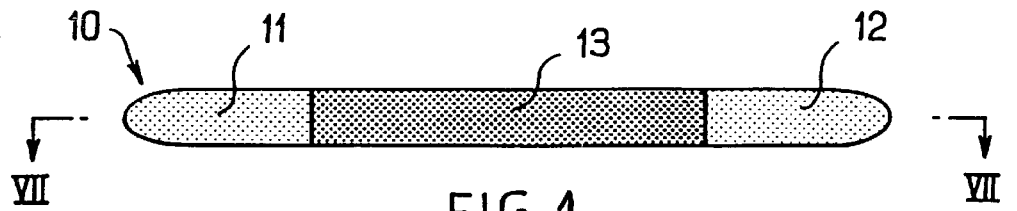
FIG._1
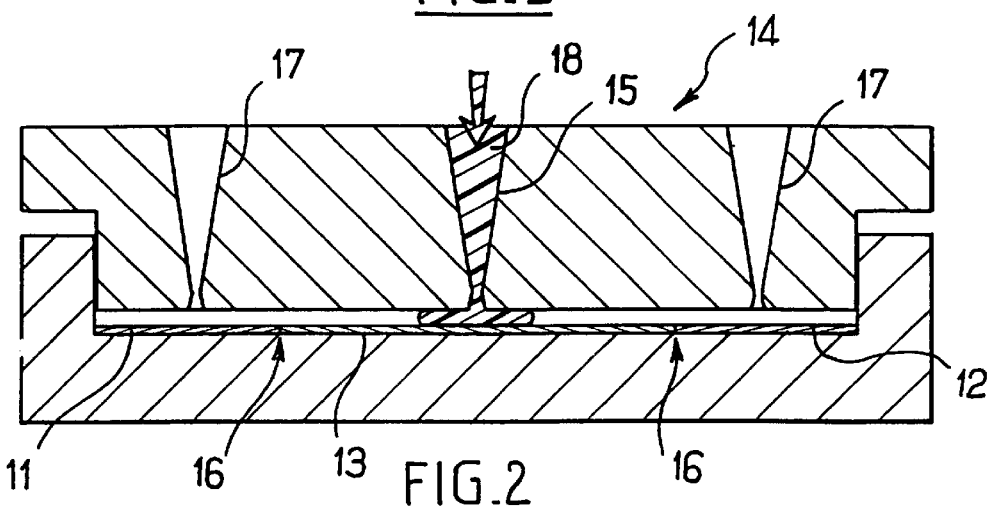
FIG._2
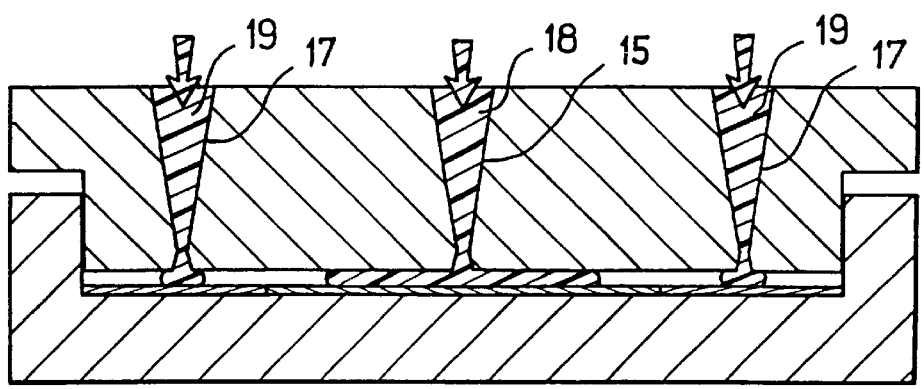
FIG._3
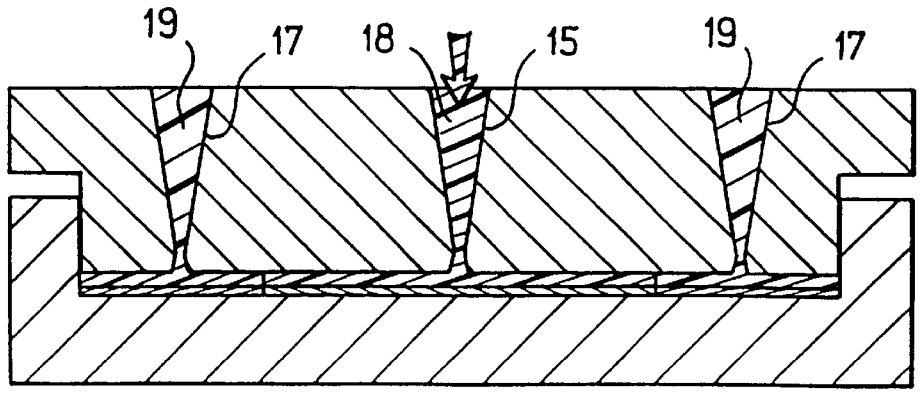
FIG._4

METHOD OF MAKING A PART HAVING FILMS COATED WITH PLASTIC

The present invention relates to a method of making a part out of plastics material that is partially or completely coated in at least two films, in particular decorative films of plastics material.

BACKGROUND OF THE INVENTION

It is known that parts can be made out of plastics material to have a face that is entirely covered in a decorative film, such as motor vehicle bodywork parts, for example, in which the outside face is coated in a film of polyvinylidene fluoride (PVDF) which has the appearance of paint, thereby avoiding the need to paint parts that have been made in that way.

A known method of manufacturing such a part consists in preforming the decorative film to give it the same shape as the surface of the part that it is to cover, in placing the preformed film in the recess of a mold whose cavity defines the part that is to be made, and then introducing a quantity of plastics material in the molten state into the mold cavity so as to be overmolded on the decorative film.

At present, such a method is implemented only for making bodywork parts in which the entire external face is coated in the decorative film, because the action of introducing thermoplastic material in the molten state into the mold tends to unstick and move the preformed film which is already in position against the mold cavity prior to the molten plastics material being introduced therein.

By providing a film over the entire external face of the part, such problems are avoided since the film as positioned in the mold covers the entire surface over which the plastics material flows within the mold.

In contrast, for bodywork parts having an outside surface that is not to be completely painted, for example the shields of bumpers or the bottom portions of the bodywork, or radiator grilles, or indeed door panels that are provided with an unpainted protective bead, and also for bodywork parts that are to have two different colors over their surfaces, traditional painting continues to be used, thereby requiring a large amount of preparatory masking work i.e. work which consists in masking those portions of the part that are not to be painted.

It will be understood that such preparation considerably increases the cost price of the parts concerned.

In addition, around the painted zone(s), it is necessary to provide a line of styling to hide any irregularities in the edge of the painted zone.

Unfortunately, in certain cases, the part would look better if such a line of styling could be omitted.

OBJECTS AND SUMMARY OF THE INVENTION

The present invention seeks to provide a novel method of obtaining plastics material parts having a surface that is coated in at least two films, in particular decorative films, with the method making it possible to obtain bodywork parts that are suitable for replacing bodywork parts that in the present state of the art are painted in part and/or painted using at least two colors.

The present invention provides a method of making a part out of plastics material coated in at least two films, in particular decorative films, on two defined zones of one of its faces, the method consisting in implementing the following steps:

preforming films to give them the shape of the face of the part over an area that is not less than the area of the zone that is to be coated;

cutting out each film to the exact dimensions of the corresponding zone that is to be coated;

positioning the preformed and cutout films in the recess of a mold, so that they do not overlap;

introducing a first quantity of plastics material in the molten state into the mold cavity behind each of the films, with introduction of plastics material into the mold cavity being controlled in such a manner firstly that the front of the plastics material flowing in the mold cavity for the purpose of filling it advances in the mold so as to stretch each film centrifugally so that the film is neither moved nor folded, and secondly that the plastics material fronts present behind each film meet either in locations of the mold where there is no film, or else in register with the facing edges of two films, where appropriate, until the entire surface of film is covered in a layer of plastics material; and then optionally introducing an additional quantity of plastics material into the mold cavity until it is completely filled.

The original feature of the present invention lies in the fact that, contrary to all expectations, if the above-specified precautions are taken, it is possible to overmold two films, and in particular two decorative films, thereby obtaining a part whose coated face presents two colors and without the edges of the films being spoiled.

Thus, the part obtained by the invention has a very clear boundary between its coated zones, assuming they are juxtaposed edge to edge, and also between each coated zone and the remainder of the surface of the part.

This gives rise to an important advantage of the method of the invention, whereby the coated zones of the part made of plastics material are very clearly defined, so the boundary between them can be less visible and can contribute to the overall good appearance of the part, without there being any need to put a line of styling between the coated zones.

The method of the invention can be implemented not only to make motor vehicle bodywork parts, but also to make internal parts for the inside of a vehicle cabin, or any other part made of plastics material and given two different colors.

The present invention also provides parts made of plastics material obtained by implementing the above-described method.

BRIEF DESCRIPTION OF THE DRAWING

In order to make the invention better understood, an embodiment is described below by way of non-limiting example and with reference to the accompanying drawing, in which:

FIG. 1 is a face view of a portion of a radiator grille coated with three decorative films;

FIG. 2 is a section view on line II—II of FIG. 1 through a mold for use in making the portion of grille shown in FIG. 1;

FIG. 3 is a view analogous to FIG. 2 at a later stage in the injection of plastics material; and FIG. 4 is a view analogous to FIG. 3 but at a still later stage of injection of plastics material.

MORE DETAILED DESCRIPTION

In the figures, a portion 10 of radiator grille has three coatings 11, 12, and 13 which are juxtaposed along its entire surface, with two of the coatings 11 and 12 being identical.

To make such a grille portion, first and second decorative films are pre-shaped to have the general shape of the grill portion that is to be made.

Once this operation has been performed, the two preformed films are superposed and cut simultaneously at the boundaries between the patterns on the part that is to be made, thereby guaranteeing that the adjacent edges of the pieces of film obtained in this way are optimally juxtaposed.

Thereafter, the two outermost pieces 11 and 12 of the first film and the central piece 13 of a second film are placed in a mold 14, specifically with all three pieces being juxtaposed to one another.

The facing edges of contiguous films form boundaries 16.

Plastics material 18 is initially injected into the mold via a central channel where the flow of plastics material within the mold exerts centrifugal force on the central piece of film 13, thereby holding it in position and ensuring that it does not fold and that it does not tear.

Once the plastics material 18 has advanced far enough in the mold to be at a distance from the boundaries 16 that is substantially equal to the distance between the outermost injection channels 17 and said boundaries 16, as shown in FIG. 2, then plastics material 19 begins to be injected via the outermost channels 17 with the flow of the plastics material being likewise controlled in such a manner that the plastics material flow exerts centrifugal forces on the outermost pieces of film 11 and 12 without folding them and without tearing them, as shown in FIG. 3.

The injection of plastics material into the central channel 15 and into the outermost channel 17 continues until the advancing fronts of plastics material meet in register with the boundaries 16 between the three pieces of decorative film, as shown in FIG. 4.

This serves to provide a portion of radiator grille as shown in FIG. 1, in which the films are specifically juxtaposed adjacent to one another.

It can be seen that the method of the invention makes it possible to provide multiple coatings on parts made of plastics material providing certain precautions are taken during injection, and without there being any need to hide the boundaries between the various coated portions of the part.

Naturally, the embodiments described above are not limiting in any way and can be modified in any desirable manner without thereby going beyond the ambit of the invention.

I claim:

1. A method of making a part having at least two films juxtaposed edge to edge and each film coated on its face with plastic material, the method consisting of the following steps:

preforming the at least two films to predetermined shapes, the face of the at least two films having an area that is not less than the area of a zone that is to be coated;

cutting out each film to exact dimensions of the corresponding zone that is to be coated;

positioning the preformed and cutout films in a recess of a mold so that the films are juxtaposed edge to edge;

introducing a first quantity of the plastic material in a molten state into the mold cavity behind each of the positioned films, with the introduction of the plastic material into the mold cavity being controlled in such a manner that a) fronts of the plastic material flowing behind each film in the mold cavity advance in the mold cavity so as to stretch each film centrifugally so that the films are neither moved nor folded;

b) the advancing fronts of the plastic material meet at a location in register with the edges of the juxtaposed films so that there is defined a clear boundary between the coated zones of the part at the location.

2. A method according to claim 1, wherein after the first quantity is introduced into the mold cavity, introducing an additional quantity of plastic material into the mold cavity until it is completely filled.

3. A method according to claim 1, wherein the preformed films are superposed and then cut simultaneously.

* * * * *